United States Patent [19]

Chagnon et al.

[11] Patent Number: 4,944,802

[45] Date of Patent: Jul. 31, 1990

[54] HIGH COERCIVITY MAGNETIC INKS AND METHOD FOR MAKING SAME

[75] Inventors: Mark S. Chagnon, Lowell; John R. Ferris, Newburyport, both of Mass.

[73] Assignee: Omni Quest Corporation, Atkinson, N.H.

[21] Appl. No.: 245,330

[22] Filed: Sep. 16, 1988

[51] Int. Cl.⁵ ............................................. C09D 11/02
[52] U.S. Cl. ........................................ 106/20; 106/23;
106/425; 106/436; 106/450; 106/456;
252/62.54; 252/62.59; 524/145; 524/141;
524/320; 524/239; 524/139; 524/157; 524/435;
524/507
[58] Field of Search ...................... 106/19, 20, 23, 403,
106/425, 436, 450, 456; 252/62.54, 62.59;
524/145, 320, 141, 239, 139, 157, 435, 507

[56] References Cited

U.S. PATENT DOCUMENTS

| | | |
|---|---|---|
| 2,751,352 | 6/1956 | Bondi . |
| 3,082,171 | 3/1963 | Shoemaker et al. .................. 106/27 |
| 3,347,815 | 10/1967 | Short et al. ........................... 524/435 |
| 3,637,553 | 1/1972 | Keberle et al. ...................... 524/507 |
| 3,700,595 | 10/1972 | Kaiser . |
| 4,026,713 | 5/1977 | Sambucetti et al. .................. 106/23 |
| 4,116,906 | 9/1978 | Ishino et al. ......................... 524/435 |
| 4,315,827 | 2/1982 | Bottenberg et al. . |
| 4,407,721 | 10/1983 | Koike et al. ......................... 252/62.59 |
| 4,420,532 | 12/1983 | Yamaguchi et al. ............... 252/62.59 |
| 4,423,452 | 12/1983 | Kajimoto et al. ................. 252/62.59 |
| 4,454,282 | 6/1984 | Bradshaw et al. ..................... 106/20 |
| 4,476,035 | 10/1984 | Miyoshi et al. ...................... 524/507 |
| 4,582,623 | 4/1986 | Kubo et al. ......................... 252/62.59 |
| 4,604,229 | 8/1986 | Raj et al. . |
| 4,636,433 | 1/1987 | Kubo et al. ......................... 252/62.59 |
| 4,687,596 | 8/1987 | Borduz et al. . |
| 4,732,706 | 3/1988 | Borduz et al. . |
| 4,770,952 | 9/1988 | Papalos ............................. 252/62.54 |
| 4,786,551 | 11/1988 | Ootani et al. ...................... 252/62.54 |
| 4,789,599 | 12/1988 | Nakamura et al. ............... 252/62.54 |
| 4,818,781 | 4/1989 | Yamakawa et al. ................ 524/435 |

OTHER PUBLICATIONS

McCutcheon's Detergents and Emulsifiers, 1978 North American Edition, pp. 113 and 168.

*Primary Examiner*—Paul Lieberman
*Assistant Examiner*—Helene Klemanski
*Attorney, Agent, or Firm*—Hamilton, Brook, Smith & Reynolds

[57] ABSTRACT

Magnetic inks useful for the production of magnetic recording products are disclosed. The present magnetic inks contain ferromagnetic barium ferrite particles dispersed in a flexible polymer medium.

26 Claims, No Drawings

HIGH COERCIVITY MAGNETIC INKS AND METHOD FOR MAKING SAME

BACKGROUND OF THE INVENTION

This invention relates to magnetic inks useful for the production of magnetic recording products, particularly in the form of magnetic stripes greater than 600 oe coercivity coated on plastic or paper stock, the surface coating being comprised of ferromagnetic barium ferrite particles in a flexible bending medium comprised of a blend of high molecular weight polyurethane thermo plastic polymer and a vinyl chloride-vinyl acetate copolymer.

Magnetic stripes have found successful applications in ID badges, credit cards, parking garage tickets, retail tags, turnpike cards, and amusement park tickets. The reasons for this wide acceptance of magnetic stripes for information storage are: cost effectiveness of magnetic storage; ease of application; ease of data introduction, data transfer and information update; high data storage capacity of magnetically encoded products, versatility of recording systems available for magnetic recording and wide range of substrate available for producing acceptable striped product.

In one popular method of producing magnetic stripes for encoding information on a paper substrate, a slurry containing finely divided gamma iron oxide, vinyl resin, and a volatile solvent is applied directly to a paper substrate by a gravure coating process. The stripe is produced as a continuous coating on a roll of paper about 10,000 feet in length. Tickets are cut from the paper roll to appropriate dimensions.

To record information on the striped ticket, the ticket is placed directly against a magnetic recording head that travels across the length of the stripe at a constant speed. The magnetic stripe is subjected to a fluctuating magnetic field, the fluctuation being set up by an incoming signal. A magnetic record of the signal is thus impressed on the stripe. When the stripe is subsequently put in contact with a similar magnetic recording head connected to a reproduction circuit, the original signal is regenerated in that circuit.

The maximum number of signals impressed on the stripe by the magnetic recording head is limited by the size of the magnetic particle in the ink slurry, the coercivity of the magnetic particle, and the surface smoothness of the stripe. Reducing the size of the magnetic particle, increasing its coercivity and preparing a smoother surface results in an increase in the number of signals per unit area impressed on the stripe. The number of signals on the stripe per unit area is referred to as the recording density.

It is desirable to produce magnetic stripes with a high recording density to maximize the amount of information carried on a single stripe.

Still further requirements of magnetic recording striped products, particularly in the fields of credit cards, turnpike tickets, transit and airline passes and retail tags is to produce a stripe that cannot be intentionally or accidentally altered easily. The problem of accidental erasure is most acute in applications, such as turnpike tickets, where the ticket after encoding will be placed near a magnetic field. An example of such a problem is a turnpike ticket placed in contact with the radio's speaker magnet on the dashboard of an automobile. Increasing the coercivity of the particle used in the ink decreases the potential for accidental or intentional unauthorized alternate of the signal.

Conventional inks for magnetic stripe applications employed prior to this invention were inherently defective in one or more particulars. Inks based on gamma iron oxide are low coercivity and, as such are capable of storing relatively small amounts of data. In addition, they are susceptible to accidental erasure from very low external magnetic fields.

Inks prepared from high coercivity particles such as cobalt ferrite, while not easily altered accidently, are made from ferrites of large particle size. This results in a rough surface that is unacceptable for magnetic recording. Small particle size cobalt ferrite are not magnetically stable and spontaneously demagnetize at temperatures above 30 deg. C. This makes them unsuitable for use in a magnetic storage medium.

Barium ferrite particles are of sufficiently high coercivity and small size to be useful. A further problem with barium ferrite, however, is the tendency for particles to stack during processing. When they are exposed to an orientation field. The orientation field is necessary to achieve high magnetic renenance. Particle orientation is a common practice in the production of magnetic recording products. The stacking of particles, however, causes the coercive force to increase so substantially that it becomes impossible to encode a signal on the stripe.

SUMMARY OF THE INVENTION

The present invention relates to magnetic inks comprising ferromagnetic barium ferrite particles, an inorganic oxide, a flexible polymer, an organic solvent and a surface active agent, and a method for marking the inks. The high-coercivity magnetic inks of the present invention have a high recording density and are particularly useful for producing magnetic recording products, such as magnetic stripes coated on plastic or paper stock.

DETAILED DESCRIPTION OF THE INVENTION

Barium ferrite particles of sufficiently small particle size to prepare smooth surface coatings and of sufficiently high coercivity to eliminate the problem of accidental or unauthorized alteration and capable of supporting high density recording have been demonstrated. The further problem with these materials is that due to their small size and platlet structure they are difficult to disperse in a usable ink formulation.

The present composition comprises barium ferrite, an inorganic oxide, a flexible polymer, an organic solvent and a surface active agent. Barium ferrite powder having a particle size of from about 0.01 to about 1.0 microns in diameter is useful for making the present inks.

Inorganic oxides which are useful in the present composition include oxides selected from the group consisting of: zinc oxide, iron oxide, titanium dioxide, tin oxide, hafnium oxide, zirconium dioxide, titanium isopropoxide and silicon dioxide. Zinc oxide having a particle size of from about 0.015 to about 0.15 microns is particularly useful.

A flexible polymer is used as a binder for the present ink composition. In a preferred embodiment of the present ink, a polymer blend consisting of a thermoplastic, high molecular weight polyurethane and a vinyl acetate-vinyl chloride co-polymer is used.

An organic solvent in which the polymer is soluble is used in the present composition. In a particularly preferred embodiment of the present composition, tetrahydrofuran is used as the organic solvent.

Surface active agents (surfactants) useful in the present composition includes surfactants having the general formula: R''—R'—R—YH wherein R'' is a solubilizing tail having a similar solubility parameter to the solvent-binder matrix (which is formed by mixing the selected polymer and the organic solvent); R' is a chemical linker selected from the group consisting of: a double bond, an ether linkage, a secondary amine, a phenyl ring, a phosphate ester and a sulfide linkage; R is an aliphatic chain about $C_4$ to $C_{20}$ in length; and YH is selected from the group consisting of: —COOH, —$NH_2$, —$PO_3H$, —$SO_3H$ or —OH. Particularly useful surfactants having this formula include lecithin, 11-phenoxy-undecanoic acid, GAFAC RE-610 (GAF Corporation) and Duomeen TDO (Armak Chemical).

The present inks are produced by combining the barium ferrite, inorganic oxide, the polymer, organic solvent and surfactant under conditions sufficient to form a stable dispersion of the magnetic particles.

A primary object of this invention is the method for producing a high coercivity magnetic ink that stabilizes small particles of barium ferrite that are uniformly and completely dispersed and are not subject to particle stacking. These inks avoid the above noted as well as other deficiencies of the prior art. The desired product is a magnetic ink, greater than 600 oe in coercivity, prepared from small ( 1 micron) ferromagnetic particles. When the ink is applied to a paper or plastic substate it will form a uniform thickness film that has a surface roughness of less than 100 microinches peak-peak. The striped product has sufficient mechanical strength, toughness and flexibility to be used on conventional magnetic stripe readers.

These and other objects and advantages are achieved in the novel constructions of the present invention as exemplified by the following specific structures.

EXAMPLES

EXAMPLE 1

8 kg. of Barium Ferrite Powder (TODA Kogyo MC-127)
0.4 kg. Alpha Iron Oxide (Pfizer R8098)
0.48 kg. Carbon Black (Cabot Pearl-2000)
0.1 Micron Zinc Oxide
0.32 kg. Soya Lecithin (Central Soya Centrolux-P)
7.4 kg. Tetrahydrofuran
0.48 kg. Polyurethane (BF Goodrich Estane 5709)
0.32 kg Vinyl Acetate/Vinyl Chloride Copolymer (Union Carbide VAGH)

All were added together in a 50 gallon stainless steel tank and mixed under high sheer with a Cowles dissolver for 6 hours. The slurry was transferred to a 1.5 lt. horizontal bead mill (Premier Mill Corp.) and pumped at a rate of 500 cc/min under the following condition:

| | |
|---|---|
| Shaft Speed | 10 m/sec |
| Temperature | 80 deg. F. |
| Media | 1.2 mm Glass Beads |
| Chamber Vol. | 1.5 Liter |
| Media Charge | 87% of Chamber |

The milled dispersion was then transferred back to the 50 gal. tank and 45 kg. of a binder solution containing 36 kg. THF, 5.4 kg. 5701 urethane and 3.6 kg. VAGH were added under constant agitation under a Cowles dissolver. Mixing was continued for 50 minutes. The final dispersion was filtered through a 1 micron wound filter cartridge. The dispersion was then coated by a gravure applicator to a paper substrate. The final coating was 1/2 inch in width and 15 microns thick. The resulting stripe had the following properties.

| | |
|---|---|
| Output at 240 BPI | 6 Volts |
| Coercivity | 3100 Oersteads |
| Br/Bm | 0.8 |
| Switching Field Dist. | 0.35 |
| Surface Roughness | 70 Microinches P/P |

EXAMPLE 2

A dispersion was prepared as in example 1 but the carbon was omitted.

EXAMPLE 3

A dispersion was prepared as in example 1 but the alpha iron oxide was omitted.

EXAMPLE 4

A dispersion was prepared as in example 1 but the zinc oxide was omitted.

EXAMPLE 5

A dispersion was prepared as in example 1 but 11 phenoxy undecanoic acid was used in place of lecithin.

EXAMPLE 6

A dispersion was prepared as in example 1 but a synthetic phosphate ester, polyoxyethylene nonylphenyl ether phosphate (GAFAC RE610) (GAF Corp.) was used in place of lecithin.

EXAMPLE 7

A dispersion was prepared as in example 1 but a synthetic amine functional surfactant, N-tallow-1,3-diaminopropane dioleate (Duomeen TDO) (Armak Chemical) was used in place of Soya lecithin.

EXAMPLE 8

A dispersion was prepared as in example 1 but the zinc oxide was 1 micron particle size.

EXAMPLE 9

A dispersion was prepared as in example 1 but the zinc oxide was 0.05 micron particle size.

EXAMPLE 10

A dispersion was prepared as in example 1 but the zinc oxide was replaced with titanium dioxide with a particle size of 0.15 microns.

EXAMPLE 11

A dispersion was prepared as in example 1 but the zinc oxide was replaced with titanium tetra isopropoxide.

Samples 2-11 were tested as #1, the results were:

| Sample | Output | Coercivity | Br/Bm | SFD | Roughness microinch |
|---|---|---|---|---|---|
| 1 | 6 V | 3100 | 0.81 | 0.35 | 70 |
| 2 | 6.2 V | 3100 | 0.80 | 0.35 | 70 |

-continued

| Sample | Output | Coercivity | Br/Bm | SFD | Roughness microinch |
|---|---|---|---|---|---|
| 3 | 6.2 V | 3120 | 0.81 | 0.36 | 60 |
| 4 | 5.2 V | 3900 | 0.74 | 0.49 | 150 |
| 5 | 6 V | 3101 | 0.81 | 0.34 | 70 |
| 6 | 6 V | 3107 | 0.80 | 0.34 | 70 |
| 7 | 6 V | 3097 | 0.86 | 0.35 | 70 |
| 8 | 6 V | 3099 | 0.81 | 0.34 | 70 |
| 9 | 6 V | 3106 | 0.80 | 0.35 | 70 |
| 10 | 6 V | 3101 | 0.81 | 0.36 | 70 |
| 11 | 6.8 V | 3100 | 0.81 | 0.31 | 60 |

Increased SFD and decreasing squareness is a strong indication of magnetic particle and iron dispersion. Increased coercivity is a result of particle stacking. Increased surface roughness and decreased output are signs of poorly dispersed particles and are unacceptable for magnetic recording devices.

Having now described our invention what we claim is:

1. A method for producing a magnetic ink comprising: combining barium ferrite powder, an inorganic oxide, a blend of a polyurethane polymer and a vinylchloride-vinyl acetate copolymer, an organic solvent and a surface active agent of the general structure R″—R′—R—YH wherein: R″ is a solubilizing tail of similar solubility parameter to a mixture of the organic solvent and the polymer blend; R′ is a double bond, ether linkage, secondary amine, phenyl ring, phosphate ester or sulfide linkage; R is an aliphatic chain about $C_4$ to $C_{20}$ in length; and YH is COOH, $NH_2$, $PO_3H$, $SO_3H$ or OH.

2. A method of claim 1 wherein the inorganic oxide comprises zinc oxide having a particle size of about 0.015 to 0.15 microns in diameter.

3. A method of claim 1 wherein the inorganic oxide is titanium dioxide.

4. A method of claim 3 wherein the titanium dioxide is made by in situ oxidation of titanium tetraisopropoxide.

5. A method of claim 1 wherein the barium ferrite has a particle size of from about 0.01-0.1 microns in diameter.

6. A method of claim 1 wherein the barium ferrite has an aspect ratio of from 1:1 to 10:1.

7. A method of claim 1 wherein the inorganic oxide is selected from the group consisting of tin oxide, hafnium oxide, zirconium dioxide, iron oxide and silicon dioxide.

8. A method of claim 1 wherein the organic solvent is tetrahydrofuran.

9. A method of claim 1 wherein the surface active agent is selected from the group consisting of: lecithin, 11-phenoxy-undecanoic acid, polyoxyethylene nonylphenyl ether phosphate and N-tallow-1,3-diamino propane dioleate.

10. A method for producing a magnetic ink having a coercivity greater than 600 oersteads comprising combining barium ferrite, an organic oxide, a blend of a polyurethane polymer and a vinyl chloride-vinyl acetate copolymer, an organic solvent and a surface active agent.

11. A method for claim 10 wherein the inorganic oxide is selected from the group consisting of: zinc oxide, iron oxide, titanium dioxide, tin oxide, hafnium oxide, zirconium dioxide, titanium tetraisopropoxide and silicon dioxide.

12. A method of claim 11 wherein the inorganic oxide comprises zinc oxide having a particle size of from about 0.015 microns to 0.15 microns.

13. A method of claim 10 wherein the organic solvent comprises tetrahydrofuran.

14. A method of claim 10 wherein the surface active agent is selected from the group consisting of: lecithin, 11-phenoxy-unecanoic acid, polyoxyethylene nonylphenyl ether phosphate and N-tallow-1,3-diamino propane dioleate.

15. A magnetic ink composition comprising:
    (a) barium ferrite;
    (b) an inorganic oxide;
    (c) a blend of a polyurethane polymer and vinyl chloride-vinyl acetate copolymer;
    (d) an organic solvent; and
    (e) a surface active agent.

16. A magnetic ink composition of claim 15 wherein the barium ferrite has a particle size of from about 0.01 to about 1.0 microns in diameter.

17. A magnetic ink composition of claim 15 wherein the inorganic oxide is selected from the group consisting of: zinc oxide, iron oxide, titanium dioxide, tin oxide, hafnium oxide, zirconium dioxide, titanium tetraisopropoxide and silicon dioxide.

18. A magnetic ink composition of claim 17 wherein the inorganic oxide comprises zinc oxide having a particle size of about 0.015 to 0.15 microns.

19. A magnetic ink composition of claim 15 wherein the organic solvent comprises tetrahydrofuran.

20. A magnetic ink composition of claim 15 wherein the surface active agent is selected from the group consisting of: lecithin, 11-phenoxyundecanoic acid, polyoxyethylene nonylphenyl ether phosphate and N-tallow-1,3-diaminopropane dioleate.

21. A magnetic ink composition comprising:
    (a) barium ferrite powder;
    (b) zinc oxide;
    (c) a blend of a polyurethane and a vinyl chloride/vinyl acetate copolymer;
    (d) tetrahydrofuran; and
    (e) lecithin.

22. A magnetic ink composition of claim 21 having a coercivity greater than 600 oersteads.

23. A magnetic ink composition of claim 21 having a surface roughness of less than 100 microinches peak to peak.

24. A magnetic ink composition of claim 21 wherein the barium ferrite has a particle size of from about 0.01 to about 1.0 microns in diameter.

25. A magnetic film coated on a plastic or paper substate comprising a magnetic ink of claim 15.

26. A magnetic film coated on a plastic or paper substrate comprising a magnetic ink of claim 21.

* * * * *